United States Patent [19]
Elmer

[11] 4,019,381
[45] Apr. 26, 1977

[54] TRANSPARENT OPTICAL POWER METER
[75] Inventor: Frank J. Elmer, Spring Lake Heights, N.J.
[73] Assignee: The United States of America as represented by the Secretary of the Army, Washington, D.C.
[22] Filed: Jan. 12, 1976
[21] Appl. No.: 648,350
[52] U.S. Cl. .......................................... 73/190 EW
[51] Int. Cl.² ........................................ G01K 17/00
[58] Field of Search ......... 73/190 EW, 190 H, 355; 250/338, 352

[56] References Cited
UNITED STATES PATENTS

| | | | |
|---|---|---|---|
| 1,988,858 | 1/1935 | Quereau | 73/355 |
| 3,280,626 | 10/1966 | Stempel | 73/190 |
| 3,348,055 | 10/1967 | Bulpitt | 73/355 |
| 3,575,048 | 4/1971 | DeBenedictis | 73/190 |
| 3,596,514 | 8/1971 | Mefferd et al. | 73/190 |
| 3,622,245 | 11/1971 | Rasmussen | 73/190 |

FOREIGN PATENTS OR APPLICATIONS

| 1,271,239 | 4/1972 | United Kingdom | 73/190 |
|---|---|---|---|

OTHER PUBLICATIONS

Edwards "A Glass Disk Talorimeter for Pulsed lasers", in J. Sci. Instruments, vol. 3, No. 6, 6/70.
Gardon "An Instrument for the Direct Measurement of Intense Thermal Radiation", in Rev. of Sci. Instruments, vol. 24, No. 5, 5/53, pp. 366–370.

Primary Examiner—Herbert Goldstein
Attorney, Agent, or Firm—Nathan Edelberg; Sheldon Kanars; Edward Goldberg

[57] ABSTRACT

Method and apparatus for measuring the average power in an optical beam comprising, optical transmission means in the form of an optical element (e.g. a lens, window, or other optical component) placed in the path of said beam, means for maintaining a substantially fixed transmission path of said beam through said optical element, means for measuring the thermal gradient between the portion of said optical element through which said beam passes and the ambient medium, and means for indicating said gradient in terms of the power remaining in the optical beam after passing through the apparatus.

11 Claims, 1 Drawing Figure

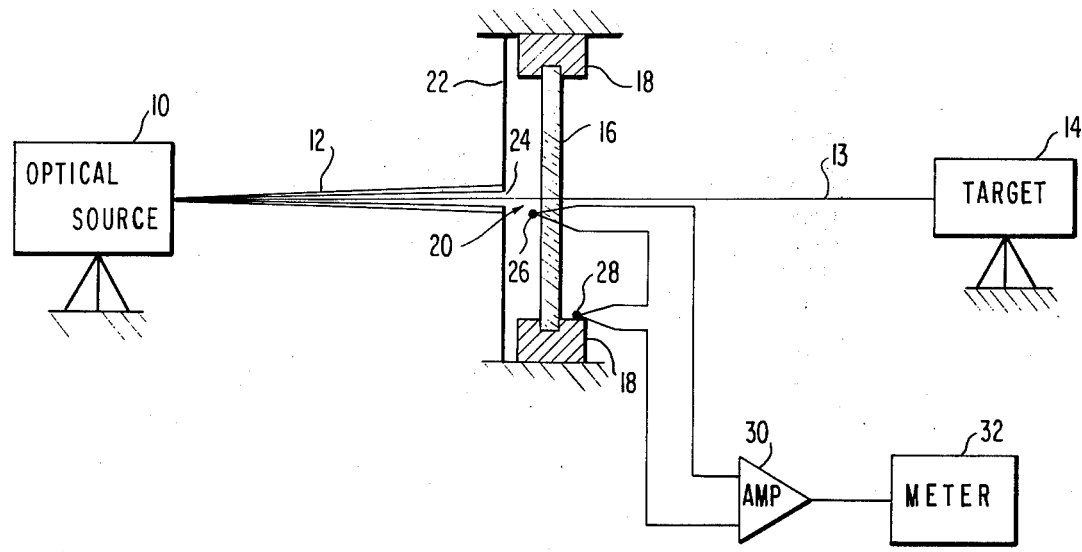

TRANSPARENT OPTICAL POWER METER

The invention described herein may be manufactured and used by or for the Government for governmental purposes without the payment of any royalties thereon or therefor.

CROSS REFERENCE TO RELATED APPLICATION

This invention is related to U.S. application Ser. No. 648,351, filed Jan. 12, 1976, entitled "Optical Alignment Sensor", in the name of Frank J. Elmer, the inventor of the present invention and which is also assigned to the same assignee.

BACKGROUND OF THE INVENTION

This invention relates generally to optical power measuring apparatus, and more particularly to a method and apparatus for measuring the average power in an intense optical beam, typically but not restricted to a laser beam.

The two most commonly used methods of measuring the power level in an optical beam are, first directing the beam onto a device whose response to the beam is known and secondly diverting a portion of the beam onto such a device. The principal disadvantages which limit the usefulness of these two methods is that the average level of power remaining in the transmitted beam is undesirably reduced as a consequence of making the measurement. If the beam is diverted from its intended target to make a measurement, the time average of the power directed toward the target will be less than the maximum available from the system, even though full power may be directed toward the target most of the time. In the same manner, if a portion of the power available in the optical beam is continuously diverted to a measuring device, the time average of the power directed to the target will be less than the peak available power from the system.

SUMMARY

When an intense optical beam passes through an optical element, a small fraction of the power is absorbed therein. This absorbed energy produces a temperature rise in the optical element which is proportional to the power remaining in the beam after it passes through the optical element. This induced temperature rise may be sensed and calibrated in terms of the optical power remaining in the beam after transmission through the optical element.

Briefly, the subject invention is directed to a method and apparatus for measuring the average power in an optical beam and comprises the combination of optical transmission means placed in the path of the optical beam, being adapted to pass the beam therethrough at a predetermined location or region, means for maintaining the substantially fixed path of the optical beam through the transmission means for a finite measurment period, means proximately located with respect to the optical transmission means and being adapted to measure the induced temperature gradient existing between said predetermined location or region through which the beam passes and the ambient medium, and providing a measurement signal output therefrom indicative of the temperature gradient, and means coupled to and responsive to the measurement signal to provide a readout in terms of power in and accordingly the power remaining in the optical beam after transmission through said apparatus.

BRIEF DESCRIPTION OF THE DRAWING

The drawing comprises a block diagram illustrative of the preferred embodiment of the subject invention.

DESCRIPTION OF THE PREFERRED EMBODIMENT

Any material which allows optical radiation to pass through it absorbs a certain percentage of the incident power and dissipates it in the form of heat. This raises the temperature of the illuminated region of the material and causes a temperature rise therein relative to an ambient medium which may be, for example, its mounting structure. If for example the absorption characteristics of material through which the optical beam passes is essentially independent of the power level of the optical beam, the ratio of the power absorbed in the material to the power in the optical beam which exits the material will be a constant. Additionally, if a constant thermal impedance exists between illuminated region of the transmission material and the mounting structure, the temperature difference between the illuminated region and the mounting structure will be linearly proportional to the heat generated in the illuminated region and is therefore linearly proportional to the optical power in the beam which leaves the material. This temperature difference can be measured and calibrated to provide a direct readout of the power in the optical beam.

Referring now to the drawing, reference numeral 10 designates an optical source which produces an intense optical beam. This source may be, for example, a laser, e.g. a CW $CO_2$ gas laser, but is not restricted to such a device, since when desirable, devices such as high intensity projectors, narrow beam flood lights, high intensity lamps for laser pumping, etc. can be utilized. As such, there is no requirement that the source necessarily provide a coherent or monochromatic light beam. The optical beam 12 emitted from the source is directed toward a target 14.

The measurement apparatus comprising the subject invention is located in the path of the optical beam intermediate the source and target and comprises the optical transmission means 16 consisting of an optical element such as a lens or window through which the beam passes. The transmission means 16 is held in position by a suitable mounting structure 18, which may consist of, for example, a metal frame of a selected design. In order to maintain a substantially fixed path of the beam 12 through the optical transmission means 16 so that the beam passes through a predetermined region 20, a shield member 22 having an appropriately sized aperture 24, is placed on the source side of the optical element 16.

Any material which allows optical radiation to pass through it absorbs a certain percentage of the incident power and dissipates it in the form of heat. This raises the temperature of the illuminated region, for example region 20, and causes a temperature rise in the material relative to an ambient medium which for convenience may be considered but not limited to the mounting structure 18. The material from which the lens or window from which the optical transmission means 16 is fabricated, is selectively chosen to have an optical power absorption characteristic which is substantially independent of the power level of the optical beam passing therethrough. When this condition is satisfied, the ratio of the power absorbed in the material to the power remaining in the optical beam after passing through the element 16, will be a constant. For a $CO_2$ laser a thin piece of silicon or zinc selenide is suitable for use. By measuring the temperature difference between the region 20 and the ambient temperature which is reflected in the temperature of the mounting structure 18, an indication of the average power remaining in the optical beam is readily available. Accordingly, a pair of temperature sensors 26 and 28 which may be, for example, thermocouples but when desirable may consist of thermistors or temperature sensitive semiconductor junction devices are respectively applied to the lens or window 16 in as close a proximity as possible to but not in the illuminated region 20 through which the beam passes and to a convenient location on the supporting structure 18. The thermocouples 26 and 28 are coupled in series so as to produce a difference signal which is applied to the input on amplifier 30 whose output is coupled to an electrical meering apparatus 32 e.g. a voltmeter which is calibrated to provide a direct readout in terms of optical power remaining in the transmitted beam 13 or if desired, the average power in the beam 12. Calibration of the metering apparatus 32 is accomplished by inserting a standard optical power meter in the beam intermediate the element 16 and the target 14.

Concerning the design considerations for the subject invention, the most critical component of the power meter is the optical transmission element 16 though which the optical beam passes. Accordingly, there are several properties which affect its suitability for use. The material, for example, should exhibit low attenuation for the optical frequencies of the intended high intensity beam which will allow the fraction of the power absorbed from the beam to be relatively small. Additionally, the material preferably should have some type of antireflection coating so that the maximum amount of incident energy from the beam will be transmitted through the material. This will increase the ratio of power absorbed in the material to the incident power on the material and will thus increase the sensitivity of the device. The material should preferably be reasonably chemically inert and of sufficient mechanical ruggedness to maintain essentially constant properties over its life span so as to minimize variations in performance. Relatively high thermal conductivity of the material is also desirable as well as a low thermal coefficient of expansion so as to minimize damage or distortion due to thermal effects, thus allowing use of high levels of beam intensity. Low specific heat is another desirable property. This minimizes heat storage in the optical element and allows a more rapid response to changes in power level of the optical beam.

As noted above, three major types of temperature sensors, e.g. thermocouples, thermistors and semiconductor junction devices are preferably utilized. Thermocouples are formed by joining two dissimilar metals to form a junction. Two such junctions in series such as shown in the figure will develop a voltage which is approximately linearly proportional to the temperature difference between the junctions. The principal advantage in using thermocouples is that there is a direct voltage output available that is essentially linear over a wide range of temperature differences. Thermistors, on the other hand, are basically resistors which have a high negative temperature coefficient. The change in resistance is proportional to the change in the absolute temperature of the thermistor. One advantage of using thermistors is that they have somewhat higher sensitivities than thermocouples and have slightly faster response times. The price paid for this improved response and higher sensitivity is in the form of more complex circuitry and the generation of heat by the bias currents which must be used with thermistors. Since the heat generation may be on the same order of magnitude as that produced in the optical element 16, the thermistor approach probably is not suitable for devices intended to measure relatively low power beams. In semiconductor junction thermal sensors, the variation of reverse saturation current with temperature is used to sense changes in the absolute temperature of the semiconductor. The advantage of such devices is that they are quite sensitive, have relatively good response time and generate negligible heat in the device due to minute bias currents utilized; however, the more complex circuitry required and the non-linear output characteristics make this type of thermal sensor less desirble than thermocouples in applications involving other than very low power optical beams.

In order not to restrict the beam unduly, yet adequately define its path, it is important that the aperture 24 in the shield 22, for example, be of the proper size. Experimentally, the proper size of the aperture for a single mode beam has been found to be about 1¼ times the size of the main intensity lobe of the beam measured where the beam would pass through the aperture. This imposes minimal restriction on the beam if correctly aligned, yet would not allow a signficant change in the path of the portion of the beam passing through the optical element 16, due to misalignment. This is significant because the meter 32 is calibrated in terms of the power remaining in the beam after being transmitted through the optical element 16.

The location of the thermal sensors 26 and 28 must be such that they are able to measure the temperature difference between the illuminated region 20 of the optical element 16 and the bulk of the supporting structure 18 which provides a stable temperature reference. When desirable, the thermal sensor 26 may be embedded in the optical element 16 itself. Since the beam 12 is attenuated by a constant fraction for each incremental distance it travels through the material from which the optical element 16 is fabricated, most of the energy will be absorbed in the region just below the surface through which the incident beam 12 enters. This means that the surface of the optical element 16 which is first entered by the optical beam will have the greatest temperature rise per unit power in the optical beam. Thus in general the thermal sensor 26 should be attached to the input surface immediately adjacent but not in the illuminated region 20.

It would also seem to be relatively easy to embed the thermal sensor 28 in the supporting structure 18. The high thermal conductivity of the supporting structure makes it reasonable to assume that the supporting structure is essentially isothermal and provides a fairly stable reference temperature. Unfortunately, this provides no clear basis for selecting the optimal placement for the sensor 28 in the supporting structure. It would appear logical to select a point near an inner wall of the supporting structure 18. This choice would provide for a better thermal tracking between two thermal sensors 26 and 28 for variations in the ambient temperature and at the same time would provide a reference against which to measure the said thermal difference induced by the optical beam.

The frequency response of the preferred embodiment in which an output is taken from a pair of thermocouples is analogous to that of a low pass filter. If the thermal time constant of the apparatus is short enough it may be possible to utilize a simple DC amplifier for the amplifier 30 shown in the figure. The amplifier need only have a flat response from DC up to some frequency higher than the reciprocal of the thermal time constant of the system. The output of this amplifier could in addition to being fed to a suitable meter 32, could be used for a feedback control of an alignment system, not shown, for maintaining correct beam position. The correct beam position would be indicated by the maximum output of the amplifier.

As noted above, one type of optical source for which the present invention is particularly adapted is the laser. When such a device is used, the material from which the optical element 16 is selected depends upon the optical frequencies generated by the laser. As noted above, where a CW (continuous wave) $CO_2$ gas laser is utilized, a plain parallel window comprised of zinc selenide manufactured by Kodak under the trade name of "Irtran", has been found to be particularly suitable; however, the infra red transmission characteristics of semiconductors such as silicon and germanium also make these materials possible for use. In view of the present state of the art of integrated circuit techniques, it is contemplated that such devices can be fabricated with built in thermal sensors and appropriate amplifiers. With proper anti-reflective coatings, it is furthermore possible to produce devices that are exceptionally sensitive and have relatively short response times.

Inasmuch as it has previously been necessary to either deflect the beam onto some type of power meter, take a measurement, and then hope that the power remains constant when the beam is again directed to the target or to incorporate a beam splitter-detector arrangement in the optical system which introduces additional optical losses thereby, the present invention provides several advantages over prior art apparatus, namely, no additonal optical losses are introduced by making the power measurement, as the optical element when modified to serve in the transparent optical power meter can perform the power measurement function in addition to its normal optical function in the system. Device complexity is reduced and reliability is increased by eliminating the need for additional devices to deflect the beam as well as the need for special detectors together with their attendant alignment problems. And finally, calibration procedures are greatly simplified as the power meter is calibrated in terms of energy projected toward the target and can be accomplished directly by placing an appropriate optical power meter in the beam path.

Having thus disclosed what is at present considered to be the preferred embodiment of the subject invention, I claim:

1. Apparatus for measuring the average power in an optical beam emitted from an optical source, comprising in combination.

an extended area optical transmission means located in the path of said optical beam, said beam passing therethrough from an input face to an output face at a predetermined limited area inner region;

support means of a different material than said optical transmission means in an outer peripheral area of said optical transmission means for supporting said optical transmission means in said beam path;

first and second temperature sensitive means connected in series and being operable to measure the temperature difference existing between an area immediately adjacent said predetermined region through which the beam passes and the temperature of said support means and generating a measurement signal indicative of said temperature difference; said first means being disposed on said input face in contact with said optical transmission means in said area immediately adjacent said inner region out of the path of said beam, said second means being disposed on said support means in said outer peripheral area adjacent said optical transmission means; and means coupled to and responsive to said temperature difference measurement signal to provide a readout of power remaining in said beam following the beam passage through said transmission means.

2. The apparatus as defined in claim 1 and additionally including:

means forming an optical beam having a focal spot in said limited region, means for maintaining a substantially fixed path of said optical beam through said optical transmission means at said predetermined region for a finite measurement period.

3. The apparatus as defined by claim 2 wherein said means for maintaining the fixed path of said optical beam through said transmission means comprises an optical shield having an aperture aligned with said predetermined region.

4. The apparatus as defined by claim 1 wherein
    each said temperature sensitive means provides a respective electrical signal responsive to temperature, and
    electrical circuit means for providing a difference signal between the respective electrical signals.

5. The apparatus as defined by claim 4 wherein said first and second temperature sensitive means respectively comprise first and second thermocouple devices and said electrical circuit means comprises means coupling said thermocouple devices in series.

6. The apparatus as defined by claim 1 wherein said optical transmission means is comprised of semiconductor material.

7. The apparatus as defined by claim 1 wherein said optical transmission means exhibits low attenuation for the optical frequencies included in the optical beam.

8. The apparatus as defined by claim 1 wherein said optical transmission means includes an anti-reflective coating.

9. The apparatus as defined by claim 1 wherein said optical transmission means contains a relatively high thermal conductivity characteristic and a relatively low specific heat characteristic.

10. The apparatus as defined by claim 1 wherein said means for measuring the temperature difference includes thermistor means.

11. The apparatus as defined by claim 1 wherein said means for measuring the temperature difference include temperature sensitive semiconductor junction means.

* * * * *

UNITED STATES PATENT AND TRADEMARK OFFICE
CERTIFICATE OF CORRECTION

PATENT NO. : 4,019,381
DATED : April 26, 1977
INVENTOR(S) : FRANK J. ELMER

It is certified that error appears in the above-identified patent and that said Letters Patent are hereby corrected as shown below:

In the heading on the Title Page:

delete - "[73] Assignee: The United States of America as represented by the Secretary of the Army, Washington, D.C."

Column 1, lines 12 and 13, delete - "and which is also assigned to the same assignee"

Signed and Sealed this

Third Day of January 1978

[SEAL]

Attest:

RUTH C. MASON
*Attesting Officer*

LUTRELLE F. PARKER
*Acting Commissioner of Patents and Trademarks*